(12) United States Patent (10) Patent No.: US 12,184,641 B1
Jones et al. (45) Date of Patent: *Dec. 31, 2024

(54) SECURE COMPUTER-IMPLEMENTED AUTHENTICATION

(71) Applicant: United Services Automobile Association (USAA), San Antonio, TX (US)

(72) Inventors: Darrius Jones, San Antonio, TX (US); Gualberto Camacho, San Antonio, TX (US); Hoang Trung Vo, Little Elm, TX (US); Huihui Wu, Grapevine, TX (US); Alejandra Valles, El Paso, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 361 days.

This patent is subject to a terminal disclaimer.

(21) Appl. No.: 17/502,856

(22) Filed: Oct. 15, 2021

Related U.S. Application Data

(63) Continuation of application No. 16/111,770, filed on Aug. 24, 2018, now Pat. No. 11,178,139.

(Continued)

(51) Int. Cl.
*H04L 29/06* (2006.01)
*G06F 16/955* (2019.01)
*G06K 7/14* (2006.01)
*H04L 9/40* (2022.01)

(52) U.S. Cl.
CPC ...... *H04L 63/0853* (2013.01); *G06F 16/9554* (2019.01); *G06K 7/1417* (2013.01)

(58) Field of Classification Search
CPC . H04L 63/0853; H04L 41/22; H04L 12/1813; H04L 41/5093; H04L 61/4535;
(Continued)

(56) References Cited

U.S. PATENT DOCUMENTS 9,781,105 B2 10/2017 Weiner et al.
9,887,992 B1 * 2/2018 Venkat ................. G06F 21/35
(Continued)

OTHER PUBLICATIONS

U.S. Appl. No. 16/111,770 U.S. Pat. No. 11,178,139, Aug. 24, 2018 Nov. 16, 2018, Secure Computer-Implemented Authentication.
(Continued)

*Primary Examiner* — Wasika Nipa
*Assistant Examiner* — Leynna Truvan
(74) *Attorney, Agent, or Firm* — Perkins Coie LLP

(57) ABSTRACT

An exemplary method comprises generating receiving an authentication request from a graphical user interface on a first computing device; generating a first encrypted media element; displaying the encrypted media element on the GUI; receiving a second encrypted media element from a second computing device; upon determining that the first and second encrypted media elements have a positive match, querying an identification value associated with the second computing device; receiving the identification value associated with the second computing device; upon the identification value matching a data record within a database, determining an account associated with the data record within the database; and authenticating the first computing device by granting the first computing device access to the account associated with the second computing device.

20 Claims, 7 Drawing Sheets

Related U.S. Application Data

(60) Provisional application No. 62/549,863, filed on Aug. 24, 2017.

(58) Field of Classification Search
CPC ............ H04L 65/1066; H04L 65/1083; H04L 65/1095; H04L 67/14; H04L 67/146; H04L 41/342; G06F 16/9554; G06F 3/048; G06F 30/12; G06F 2206/1008; G06F 2209/545; G06F 9/45533; G06F 16/444; G06F 11/324; G06K 7/1417; G01N 2035/0091; G01N 29/0645; G01R 1/025; G05B 2219/13144; G05B 2219/32128; G05B 2219/32246; G08B 13/19682; G10H 2220/091; H02J 13/00001; H04N 23/631; H04N 1/00233; H04N 2201/0089; H04Q 2213/13175; H04Q 2213/13525; G01V 2210/125; G07F 9/023; G01S 7/04; G01S 7/064; G01S 7/24; G01S 7/51; G01S 7/56; G01S 7/6218

See application file for complete search history.

(56) References Cited

U.S. PATENT DOCUMENTS

| | | |
|---|---|---|
| 10,511,592 B1 | 12/2019 | Phruksawan et al. |
| 11,178,139 B1 | 11/2021 | Jones et al. |
| 2011/0219427 A1 | 9/2011 | Hito et al. |
| 2015/0047024 A1 | 2/2015 | Park |
| 2015/0199502 A1* | 7/2015 | Chen ................. G06F 21/32 705/325 |
| 2016/0212073 A1* | 7/2016 | Kulkarni ............. H04L 67/02 |
| 2016/0371683 A1 | 12/2016 | Maus et al. |
| 2017/0046605 A1 | 2/2017 | Asthana et al. |
| 2017/0187709 A1 | 6/2017 | Rotem et al. |
| 2018/0048864 A1 | 2/2018 | Taylor et al. |
| 2018/0262505 A1 | 9/2018 | Ligatti |
| 2018/0332042 A1 | 11/2018 | Yu et al. |
| 2020/0134147 A1 | 4/2020 | Van Den Hoven |

OTHER PUBLICATIONS

U.S. Appl. No. 62/549,863, filed Aug. 24, 2017, Secure Computer-Implemented Authentication.

* cited by examiner

SECURE COMPUTER-IMPLEMENTED AUTHENTICATION

CROSS-REFERENCE TO RELATED APPLICATIONS

This application is a continuation of U.S. patent application Ser. No. 16/111,770, filed on Aug. 24, 2018, entitled "SECURE COMPUTER-IMPLEMENTED AUTHENTICATION," which claims priority to U.S. Provisional Application No. 62/549,863, filed Aug. 24, 2017, entitled "SECURE COMPUTER-IMPLEMENTED AUTHENTICATION," both of which are hereby incorporated by reference in their entireties.

TECHNICAL FIELD

This application relates generally to electronic authentication methods.

BACKGROUND

As the processing power of computers allow for greater computer functionality and the Internet and network technology era allow for interconnectivity between computing systems, more people rely upon computing devices to store highly sensitive data and/or conduct everyday tasks. For example, reliance on online banking, online shopping, and other online services has increased drastically during the Internet era. However, since the implementation of these more sophisticated online tools, several technical shortcomings in these technologies have been identified and have created a new set of challenges. For example, conventional software solutions have failed to provide a fast, efficient, and secure user authentication method. Existing and conventional software solutions mainly rely on the static authentication methods (username and passcodes). Users' authentication information (e.g., username and passcodes) are typically stored into an internal database, which allows the server to match the received user credentials with the stored authentication criteria and, upon a positive match, grant access to the user's computing device or an account within a database. These conventional software solutions are unsecure because an internal database (e.g., the database storing the user's credentials) may be subjected to a cyber-attack and the content of the database may be revealed to a hostile third-party, thus jeopardizing user's highly sensitive data and account information.

SUMMARY

For the aforementioned reasons, there is a need for a more accurate system and method, which would allow institutions to accurately authenticate users. Disclosed herein are systems and methods a secure and intelligent authentication method.

To improve conventional authentication methods, a multi-device authentication method may be provided. For instance, upon receiving an authentication request from a first computing device, a central server may generate a first media element (e.g., first image) and display the first media element on a webpage displayed on the first computing device. The central server may then prompt the user requesting to be authenticated to capture a second media element (e.g., image or a video of the first media element displayed on the webpage displayed on the first computing device) using a second computing device (e.g., mobile device equipped with a camera). Upon receiving the second media element form the second computing device, the central server may determine whether the first and the second media elements match. Upon determining a positive match, the central server may then retrieve an identifier of the second computing device, identify an account associated with the identifier, and grant the first computing device access to the identified account.

In an embodiment a computer-implemented method comprises receiving, by a server, an authentication request from a first computing device; generating, by the server, a first media element associated with the authentication request configured for display on a webpage via a browser executing on the first computing device; receiving, by the server, a second media element from a second computing device, wherein the second media element is an image of the first media element displayed on the first computing device; upon determining that the first and second media elements have a positive match: retrieving, by the server, an identification value associated with the second computing device; upon the identification value matching a data record within a database, determining an account associated with the second computing device; and authenticating, by the server, the first computing device by granting the first computing device access to the account associated with the second computing device.

In another embodiment, a computer system comprises: a first computing device configured to receive an authentication request from a user; a second computing device configured to capture and transmit images; and a server in communication with the first computing device and the second computing device, wherein the server: receives an authentication request from the first computing device; generates a first media element associated with the authentication request, the first media element being configured for display on a webpage via a web browser application executing on the first computing device; displays the first media element on a graphical user interface displayed on the first computing device, wherein the second media element is an image of the first media element displayed on the webpage; receives a second media element from the second computing device; upon determining that the first and second media elements have a positive match: retrieves an identification value associated with the second computing device; upon the identification value matching a data record within a database, determines an account associated with the second computing device; and authenticates the first computing device by granting the first computing device access to the account associated with the second computing device.

In another embodiment, a computer-implemented method comprises receiving, by a server, an authentication request from a graphical user interface displaying on a first computing device, whereby the graphical user interface is generated by a virtual assistant server and comprises a plurality of data fields configured to receive data from a user operating a first computing device; generating, by the server, a first encrypted media element associated with the request; generating, by the server, an instruction to display the first encrypted media element on the graphical user interface; transmitting, by the server, the instruction to the virtual assistant server, whereby the virtual assistant server displays the first encrypted media element on the graphical user interface; storing, by the server, the first encrypted media element in a database, wherein the database is configured to store a plurality of data records associated with account data of a plurality of users, media elements, and computing device identifiers; receiving, by the server, a second media element from a second computing device, wherein the second media element is an image of the first media element displayed by the virtual assistant server; querying, by the server, the database to retrieve the first unique media element; when the first unique media element and the second media element have a positive match, querying, by the server, an identification value associated with the second computing device; receiving, by the serve, the identification value associated with the second computing device; querying, by the server, the database to retrieve a data record associated with the identification value associated with the second computing device; upon the identification value matching a data record within a database, determining an account associated with the data record within the database; generating, by the server, a second instruction authenticating the first computing device by granting the first computing device access to the account associated with the second computing device; and transmitting, by the server, the second instruction to the virtual assistant server, whereby the virtual assistant server displays a message confirming the authentication.

It is to be understood that both the foregoing general description and the following detailed description are exemplary and explanatory and are intended to provide further explanation of the embodiments described herein.

BRIEF DESCRIPTION OF THE DRAWINGS

The foregoing summary, as well as the following detailed description, is better understood when read in conjunction with the appended drawings. For the purpose of illustrating the claimed subject matter, the drawings show example constructions of various embodiments; however, the claimed subject matter is not limited to the specific methods and instrumentalities disclosed.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
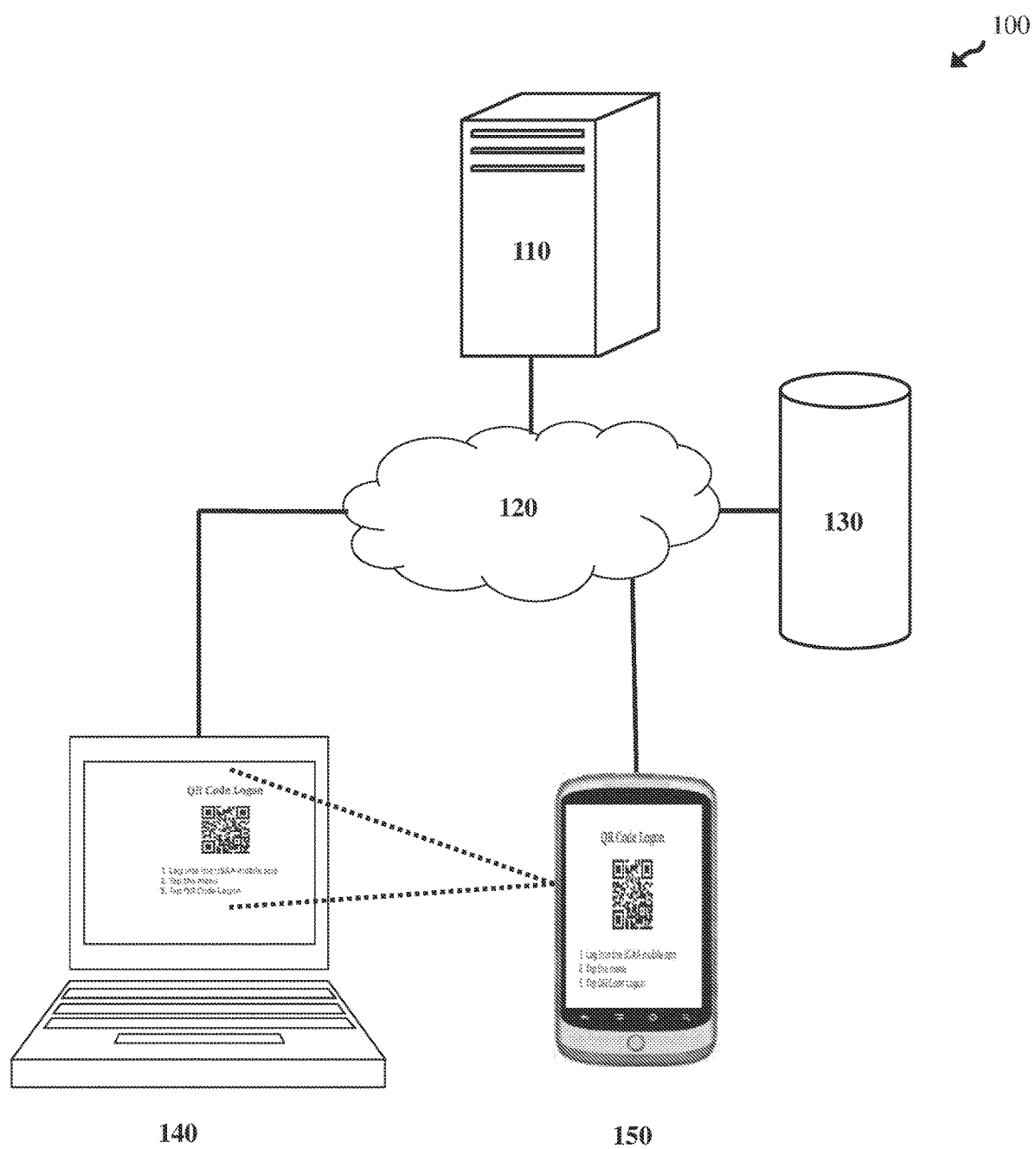
FIG. 1 illustrates an example of a computer system for providing a secure computer-implemented authentication, according to an embodiment.

FIG. 1 illustrates components of a system 100, according to an embodiment. The system 100 comprises an analytics server 110, a communication network 120, a database 130, a client computing device 140, and a mobile device 150. The analytics server 110 may communicate with the client computing device 140, the mobile device 150, and the database 130 using the communication network 120.

In operation, the analytics server 110 may request the database 130 to store, receive, or retrieve various forms of analytical data. The database 130 may store data records that are associated with different users, such as user identification, user account identifiers, account information, device identifiers, and data generated as a result of users' interactions with the analytics server 110. For example, database 130 may be configured to store user accounts and organize all user data based on their respective user identifier. The database 130 may also store data records of user interactions with the mobile device 150 when executing a web-application or any other electronic platform associated with the analytics server. The database 130 may receive user preferences or any other user-specific data from the analytics server 110 along with an instruction to store said data for later analysis or retrieval. The database 130 may be hosted on any number of computing devices comprising a non-transitory machine-readable storage medium capable of storing data records generated, and in some cases received from the analytics server 110, the mobile device 150, or other computing devices (e.g., public websites, or a central database associated with the analytics server 110). The database 130 may further comprise a processor capable of executing various queries and data record management processes, according to instructions from the analytics server 110. The database 130 may be hosted on a distinct computing device that is in networked-communication with the analytics server 110, the mobile device 150, or a computer system associated with customers.

The analytics server 110 may perform various analytics on data records stored in the database 130 and transmit the results to the client computing device 140 or the mobile device 150. The analytics server 110 may be any computing device comprising a processor capable of performing the various tasks and processes described herein. Non-limiting examples of the analytics server 110 may include a server, desktop, laptop, tablet, and the like. The analytics server 110 comprises any number of computer-networking components, which facilitate inter-device communications via the communication network 120. There may be any number of distinct computing devices functioning as the analytics server 110 in a distributed computing environment. The analytics server 110 may communicate data records and instructions to the database 130, where the data records may be stored in the database 130 and where various analytics may be performed on the data by the database 130 in accordance with instructions from the analytics server 110. The analytics server 110 may host an online service, such as cloud-computing application service, an online shopping site, or any other service that provide customer-facing web-based applications that collect customer data through web-based transactions with a computer system associated with customers such as the mobile device 150 over one or more networks such as the communication network 120.

A client computing device 140 may be any computing device allowing a user to interact with analytics server 110 via communication network 120 or otherwise (e.g., a website or any other graphical user interface provided by the analytics server 110). The client computing device 140 may execute an Internet browser or local application that access the analytics server 110 in order to issue requests or instructions to the analytics server 110 to access an account or other data stored within database 130. The client device 140 may transmit user credentials from user inputs to the analytics server 110, from which the analytics server 110a may authenticate the user. The client computing device 140 may comprise any number of input devices configured to receive any number of data inputs, including various types of data inputs allowing for authentication (e.g., username, passwords, certificates, and biometrics). The client device 140 may be any computing device comprising a processor and non-transitory machine-readable storage medium allowing the client device 140 to perform the various tasks and processes described herein. As an example of the client computing device 140 operation, the client computing device 140 may execute an Internet browser that accesses the analytics server 110 hosting a website (or any other user interface) that allows the user to access and/or manage his/her account.

Communication network 120 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication network 120 may also include a number of different types of networks, such as, for example, an intranet, a local area network (LAN), or a wide area network (WAN).

In operation, the analytics server 110 may receive a request (from the client computing device 140) to access data stored within the database 130. The analytics server 110 may determine that the request requires the user operating the client computing device 140 to be authenticated and generates an encrypted media element to be displayed on the client computing device 140 (e.g., on a graphical user interface provided by the analytics server 110 and displayed on the client computing device 140). The user operating the client computing device 140 may use the mobile device 150 to transmit a media element (e.g., a picture or a QR code) to the analytics server 110 (e.g., via an application associated with the analytics device). Upon receipt of the media element from the mobile device 150, the analytics server may compare the media element received with the media element displayed on the client computing device 140; upon a positive verification, the analytics server may grant the computing device access to the account associated with the mobile device 150. Even though the mobile device 150 is illustrated in FIG. 1 as a smartphone, it may be any computing device, such as any mobile phone, tablet, smart watch, personal data assistant, gaming console, or personal computer capable of transmitting a media element associated with the media element displayed on the client computing device (e.g., the mobile device 150 may be configured to take pictures and/or video from the client computing device 140). The mobile device 150, in some embodiments, is also capable of installing an application (or any other API) in direct communication with the analytics server 110.

Various modifications to these embodiments will be readily apparent to those skilled in the art, and the generic principles defined herein may be applied to other embodiments without departing from the spirit or scope of the embodiments described herein. Thus, the embodiments described herein are not intended to be limiting. While various aspects and embodiments have been disclosed, other aspects and embodiments are contemplated. The various aspects and embodiments disclosed are for purposes of illustration and are not intended to be limiting, with the true scope and spirit being indicated by the following claims.

Figure 2:
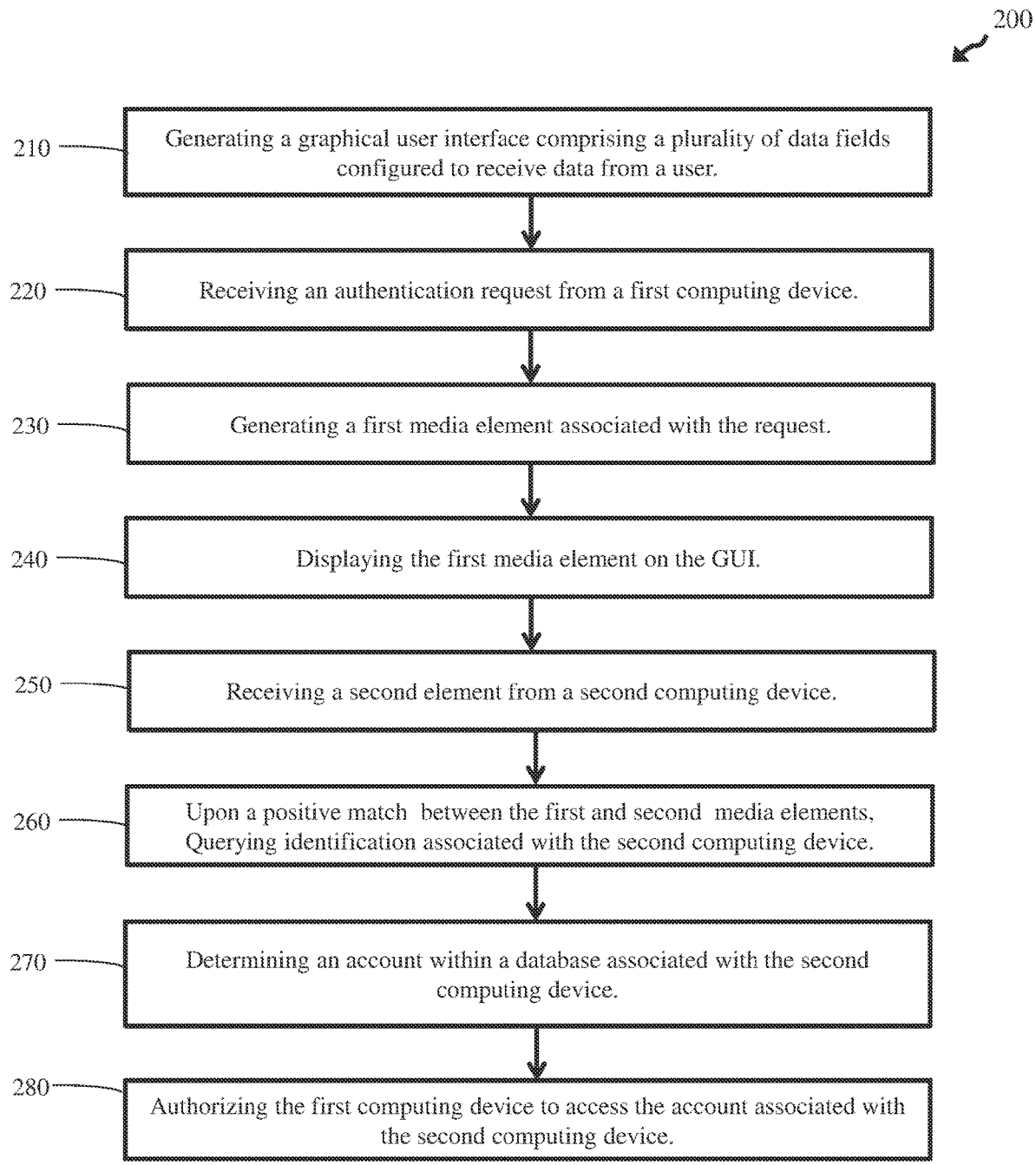
FIG. 2 illustrates a flowchart depicting operational steps of a method for providing a secure computer-implemented authentication, according to an embodiment.

Referring now to FIG. 2 a flowchart depicting operational steps of a method for providing a secure computer-implemented authentication is illustrated in accordance with an embodiment. Steps of the method 200 may be implemented using one or more modules of the analytics server, the communication network, the mobile device, the database, and the client computing device. FIG. 2 does not imply any limitations with regard to the environments or embodiments that may be implemented. Modifications to the depicted environment or embodiment shown in FIG. 2 may be made.

At step 210, the analytics server may generate a graphical user interface comprising a plurality of data fields configured to receive data from a user. The analytics server may generate a graphical user interface in order to provide services to variety of clients. In an embodiment, the graphical user interface may be a website hosted by the analytics server, which is available to different clients. The purpose of said website may be to collect user's information, provide a platform to securely upload data, provide online services, and/or possibly retrieve user's data from a database. The user may have access to the website provided by the analytics server in order to update and/or modify user's information or retain any service rendered and associated with the analytics server. In an embodiment, the analytics server may generate the GUI or instruct a third-party to generate and/or host the GUI.

At step 220, the analytics server may receive an authentication request from the graphical user interface displaying on a first computing device. The analytics server may receive a request to retrieve data from a database (such as the database 130 described in FIG. 1). In some embodiments, the request may be received upon the user (operating the client computing device) requesting to log into the website hosted by the analytics server. The user may also request retrieval or access to his information stored in the database. For example, the user may request to log in or request to check his account balance. The analytics server may determine that the request (received from the computing device) requires authentication. Upon the request requiring an authentication of the user, the method 200 moves to step 230.

At step 230, the analytics server may generate a first media element associated with the request. An example of a media element may be an image containing a quick response code (QR code) uniquely generated for this particular authentication instance. A QR Code may be a type of encrypted matrix barcode (two-dimensional or three-dimensional barcodes). A QR code is a machine-readable optical label that may contain data associated with the user or other data uniquely created for the requested authentication. The analytics server may generate the image containing the QR Code based upon one or more data fields of the user record including a user identifier, device identifier associated with the computing device, and the like. In other embodiments, the analytics server may generate the QR Code based on purely unique and randomly generated values. A QR code may consists of black squares arranged in a square grid on a white background, which can be read by an imaging device such as a camera, and processed using Reed-Solomon error correction until the image of the QR code can be appropriately interpreted. The required data may be then extracted from patterns that are present in both horizontal and vertical components of the image.

Although an image is used as an example, it is intended that any media element can be used, such as images (e.g., GIF, JPEG, TIFF, PNG, BMP), videos (e.g., AVI, QuickTime, Windows Media), stickers, ideograms (e.g., EMOJIs), alphanumeric characters, different sounds (MPEG files and the like) and links to a desired websites. In some configurations, the first media element may be an encrypted media element that is embedded within another media element. For instance, the QR code (or any other encrypted/unique first media element) may be embedded within an image or GIF file displayed on the webpage (e.g., the graphical user interface displayed on the client computing device). In some embodiments, the media element is not encrypted and is only unique (e.g., unique per authentication request). For example, the analytics server may generate a unique machine-readable media element based on above-mentioned information, which is only valid for a one-time authentication use. In other embodiments, the analytic server may generate and encrypt the media element based on a variety of known methods.

At step 240, the analytics server may display the first media element on the graphical user interface. For instance, the analytics server may render/display the image containing the QR code on a website displayed on the client computing device via a web browser application executing on the client computing device. In some configurations, the analytics server may display/render the first media element on the same webpage as step 210. The analytics server may update the graphical user interface (displayed on the client computing device) to display/render the generated first media element. The analytics server may also generate and transmit authentication instructions to the client computing device. For example, the authentication instructions may instruct the user to enter a pin code or capture an image of the first media element displayed on the client computing device. In some embodiments, the first media element may be visible within the graphical user interface. In some other embodiments, the first media element may be a watermark media element that is not easily visible to the naked eye. A watermark media element, as used herein, refers to a media element embedded within the graphical user interface typically being undetectable during normal viewing of the graphical user interface. For the instance, a user may not be able to detect the watermark media element because the watermark media element may not be detectable to naked eye.

Figure 4A:
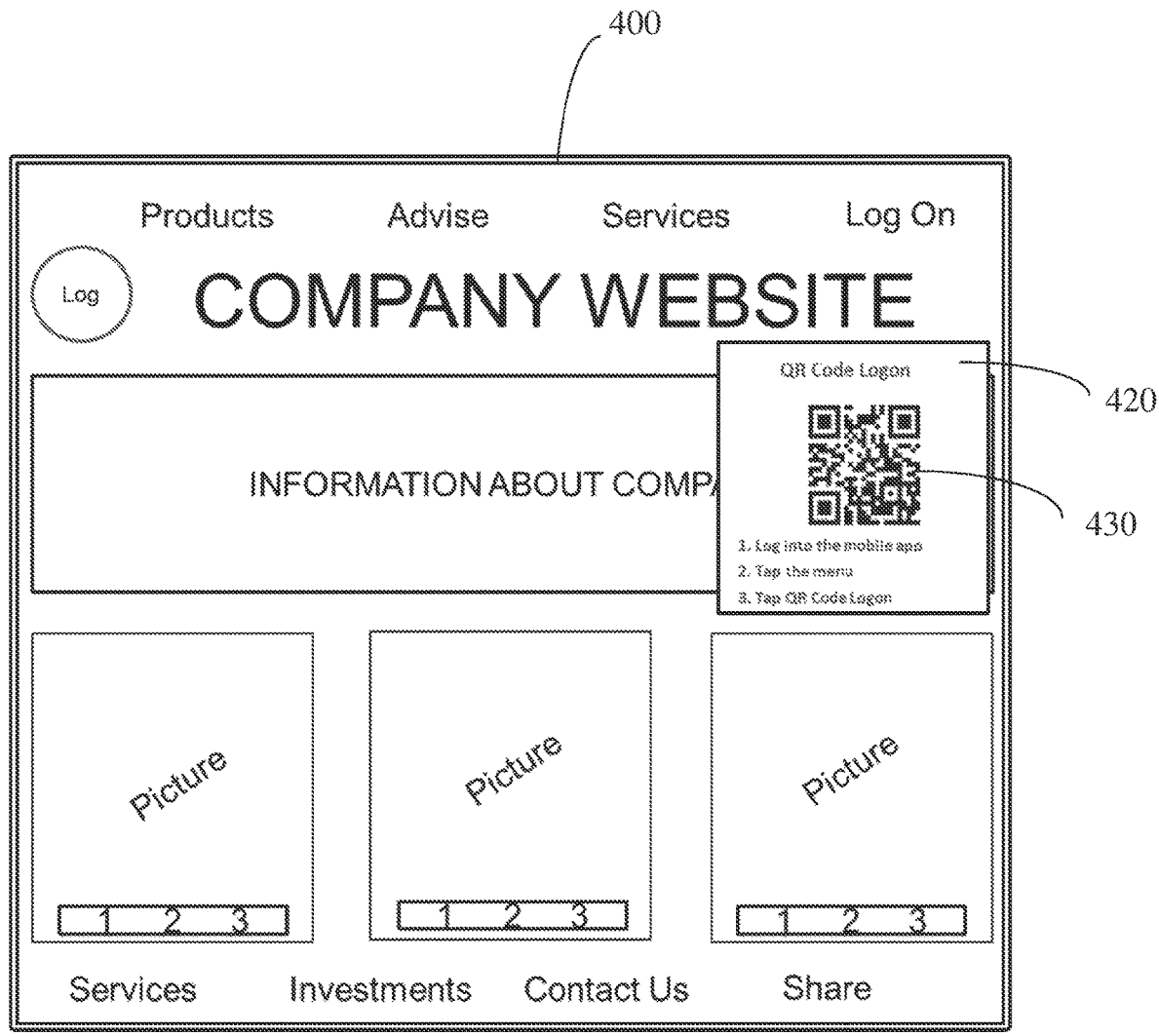
FIG. 4A illustrates an example of a graphical user interface including an encrypted media element provided by the analytics server and displayed on the client computing device, according to an embodiment.

Referring now to FIG. 4A, an example of a graphical user interface including a first media element provided by the analytics server and displayed on the client computing device is illustrated. In this embodiment, the analytics server may generate the graphical user interface 400 and display GUI 400 on a computing device associated with a user (e.g., client computing device depicted in FIG. 1). In some configurations, GUI 400 may be a webpage displaying on the client computing device via a web browser application. Upon receiving an authentication request, the analytics server may generate media element 430. Media element 430 is a QR code that is generated based on randomly selected values. Furthermore, media element 430 is unique to the authentication request. The analytics server may update GUI 400 to display media element 430 and instruction box 420. Instruction box 420 may provide detailed instructions to the user as to how to proceed. For example, instruction box 420 may instruct the user to log in the mobile application (provided by the analytics server), tap the menu, and tap the QR code.

In some other embodiments, the analytics server may display more than media elements. For instance, the analytics server may randomly generate one or more numbers and display the numbers in one or more predetermined locations within the graphical user interface displayed on the client computing device. For instance, in FIG. 4B, an example of a graphical user interface including multiple randomly generated numbers is illustrated. In this embodiment, the analytics server may generate the graphical user interface 401 and display GUI 401 on a client computing device operated with a user (e.g., client computing device depicted in FIG. 1). Upon receiving an authentication request, the analytics server may randomly generate multiple numbers and display media element 440 and 450 accordingly (displaying the randomly generated numbers). In some configurations, not shown, an instruction box may instruct the user to capture an image of their entire screen.

Referring back to FIG. 2, at step 250, the analytics server may receive a second media element from a second computing device. The analytics server may receive a media element from a different computing device displaying the first media element (e.g., other than the client computing device). The second media element may comprise a QR Code, images (e.g., GIF, JPEG, TIFF, PNG, BMP), videos (e.g., AVI, QuickTime, Windows Media), stickers, ideograms (e.g., EMOJIs), and alphanumeric characters. In some configurations, the second media element may purport to contain or otherwise include the first media element. For instance, a user operating the second computing device may capture an image from the client computing device (e.g., GUI 400 or 401) and transmit the image to the analytics server.

For instance, the analytics server may receive the second media element from a mobile device operated by the user (e.g., mobile device 150 described in FIG. 1). In some embodiments, the user, according to the instruction displayed by the analytics server, may capture an image from the QR code displayed on the graphical user interface (step 230-240). The user may also transmit the image to the analytics server. The user may transmit the second media element (e.g., image) to the analytics server via a variety of methods. For example, the user may use the mobile device to text or email the second media element using a predefined communication identifier provided by the analytics server. The user may also use an application associated with and in direct contact with the analytics server to transmit the image to the analytics server. For example, the analytics server may generate a second graphical use interface configured to be displayed on an application installed onto the mobile device.

Figure 4B:
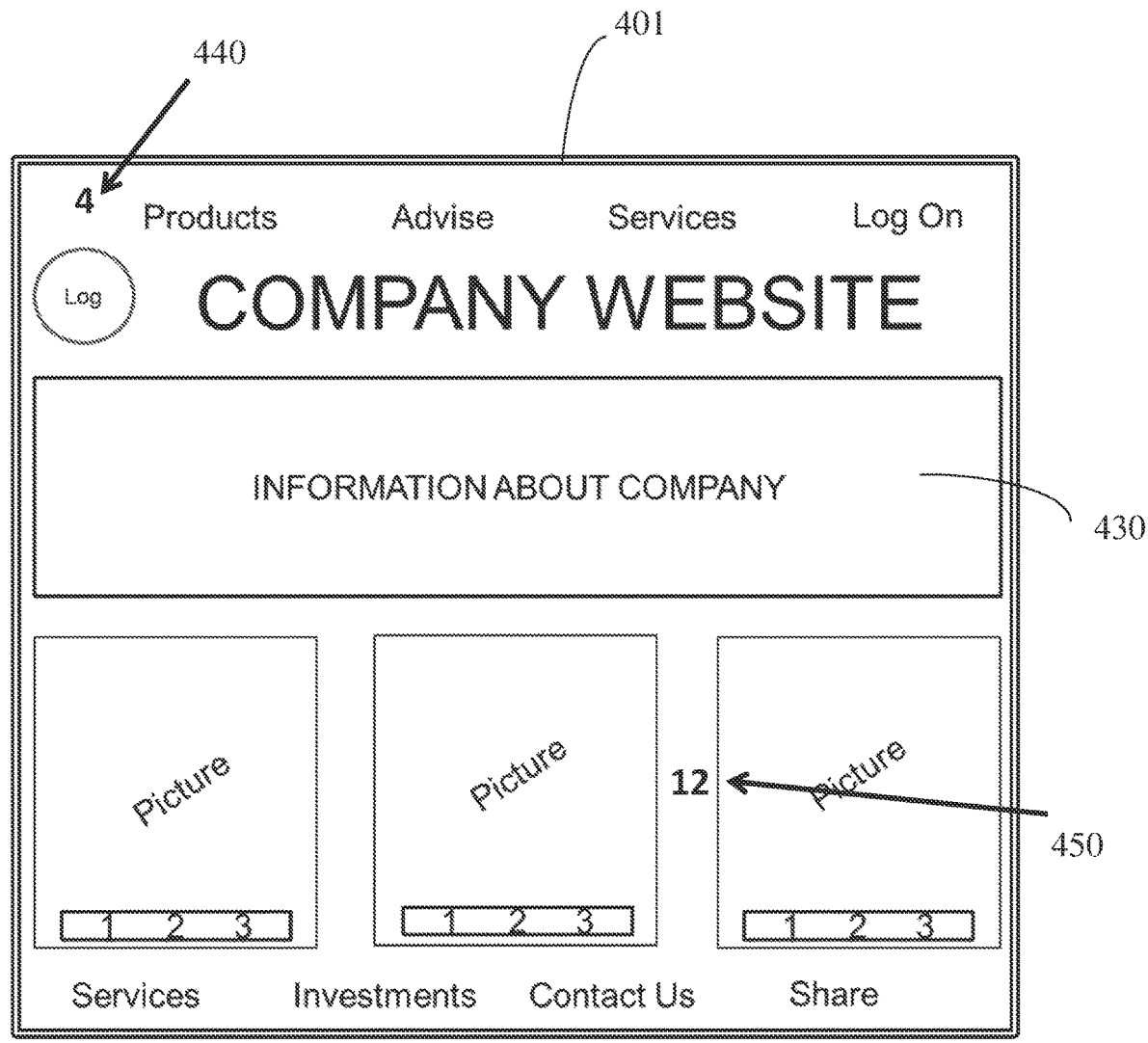
FIG. 4B illustrates an example of a graphical user interface including an encrypted media element provided by the analytics server and displayed on the client computing device, according to an embodiment.

In some configurations, for instance the embodiment depicted in FIG. 4B, the second media element may be an image of the entire screen (e.g., GUI 401). The analytics server may identify the numbers received within the second media element and compare them to the randomly generated numbers displayed on the client computing device. When the analytics server determines a match, the analytics server may authenticate the user and grant the client computing device access to the corresponding user account.

Figure 3:
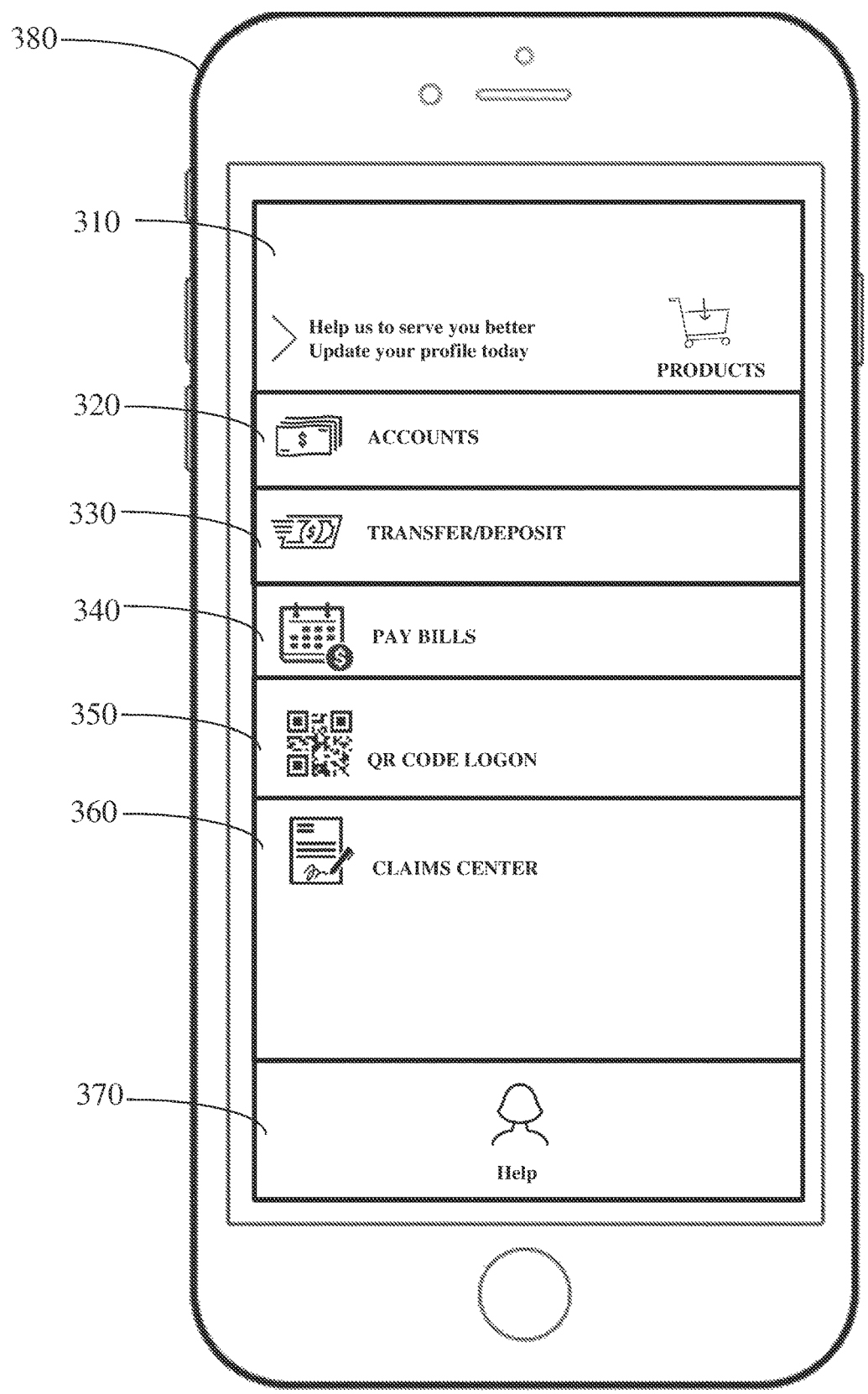
FIG. 3 illustrates an example of a graphical user interface displayed on a user's mobile device, according to an embodiment.

Referring now to FIG. 3, an example of a graphical user interface displayed on a mobile device application is illustrated. The analytical server may generate the graphical user interface 310 to be displayed on an application (associated with the analytics server) installed and executing on the mobile device 380. Upon the user initiating the application associated with the analytics server, the analytics server may display an authentication request to grant the user access to the mobile application. The analytics server may use a variety of different methods to accomplish this task. For example, the analytics server may use a static username and passcode method where the analytics server request the user to input a user name and passcode; upon the username and passcode matching user's identification/authentication data within the database, the analytics server may grant user access to the mobile application.

In another example, the analytics server may use a dynamic passcode to authenticate the user on the mobile application. A dynamic passcode, as used herein, refers to a synchronous dynamic password token. In those embodiments, the analytics server may use a predetermined time algorithm to rotate through various combinations of passcode and/or randomly generated values produced by a cryptographic algorithm. In some embodiments, the analytics server may use a specific algorithm (e.g., by limiting the number of rotations of the various combinations of passcode and/or randomly generated values) to generate the dynamic password. For example, the analytics server may use dynamically determined behavior to stop the cryptography element from rotating (e.g., generating the dynamic passcode) to reduce the risk of a cyber-attacker from predicting the next generated cryptographic element, such as the dynamic passcode.

In yet another embodiment, the analytics sever may use the authentication methods provided by the mobile device. For example, the analytics server may require the user to provide a biometric-based input (e.g., fingerprint, facial picture, and the like) and use the biometric-based authentication data existing within a database associated with the mobile device to authenticate the user. The mobile application may include an API module that automatically queries and retrieves the authentication data from the database associated with the mobile device and transmit said data to the analytics server. Upon granting access to the user (on the mobile application) the analytics server may display graphical user interface 310 on mobile device 380. GUI 310 may include different boxes representing different options to access different services provided by the analytics sever. For example, GUI 310 may include box 320 (granting access to the user's financial information), box 330 (providing the option to the user to transfer and/or deposit money), 340 (providing the option to pay bills), and box 350 (providing the option to take a picture of the media element displayed on the computing device), box 426 (providing options to purchase different products), and box 360 (providing the option to be transferred to a help center). The analytics server may also provide box 370 and provide the user with the option of contacting a customer service representative. Upon the user clicking on box 350, the analytics server may activate (or instruct to activate) a camera associated with the mobile device 380. The user operating the mobile device 380, may then take a picture (or generate other media elements such as video and the like) of the media element displayed on the computing device (e.g., media element 430 illustrated in FIGS. 4A-B). The mobile application may then transmit the picture of the media element to the analytics server.

Referring back to FIG. 2, at step 260, the analytics server may determine whether the first and the second media elements have a positive match. Upon determining that the first and second encrypted media elements have a positive match, the analytics server may query an identification value associated with the second computing device and receive the identification value associated with the second computing device. The analytics server may use image matching or image recognition technology known in the art to compare the first media element (already stored in an internal or an external database) and the second media elements. If either of the first or the second media elements is encrypted, the analytics server may decrypt the encrypted media element before comparing the media elements. For example, if the first QR Code (e.g., first media element) is generated using randomly generated values, the analytics server may (upon receiving the second media element) determine the values associated with the second QR Code and compare said values to the values associated with the first media element (e.g., QR Code displayed on the computing device). When the first and the second media elements match, the analytics server may query and receive (e.g., generate an instruction to receive) an identifier associated with the second computing device.

The identifier may be unique or may help identify the second computing device. Non-limiting examples of such identifiers may include unique device identifier (UDID), media access control (MAC) address or identifier, phone number, user ID, and manufacturing serial number, among others. For example, an identifier may include the phone number of the mobile device. The analytics server may instruct the mobile application to transmit the identifier associated with the second computing device to the analytics server.

At step 270, the analytics server may determine an account within an internal or external database, which is associated with the second computing device. The analytics server may determine an account associated with the identifier of the second computing device. Upon receipt, the analytics server may query and retrieve data within the database to determine whether the identifier is associated with a record of an account within the database. In some other embodiments, the analytics server may directly instruct the mobile application (or other API associated with the analytics server) to transmit the account associated with the second computing device. As described in FIG. 3, the mobile application may authenticate the user and grant the user access to his or her account.

At step 280, the analytics server may authenticate the first computing device by granting the first computing device access to the account associated with the second computing device. The analytics server may authenticate the first computing device based on the account data associated with the account associated with the second computing device's identifier. The analytics server may grant the first computing device access to the account determined to be associated with the second computing device (step 270). The analytics server may login the user operating the first computing device to an account associated with the second computing device. The analytics server may also display an authentication message to the first or the second computing devices, as described below.

Figure 6:
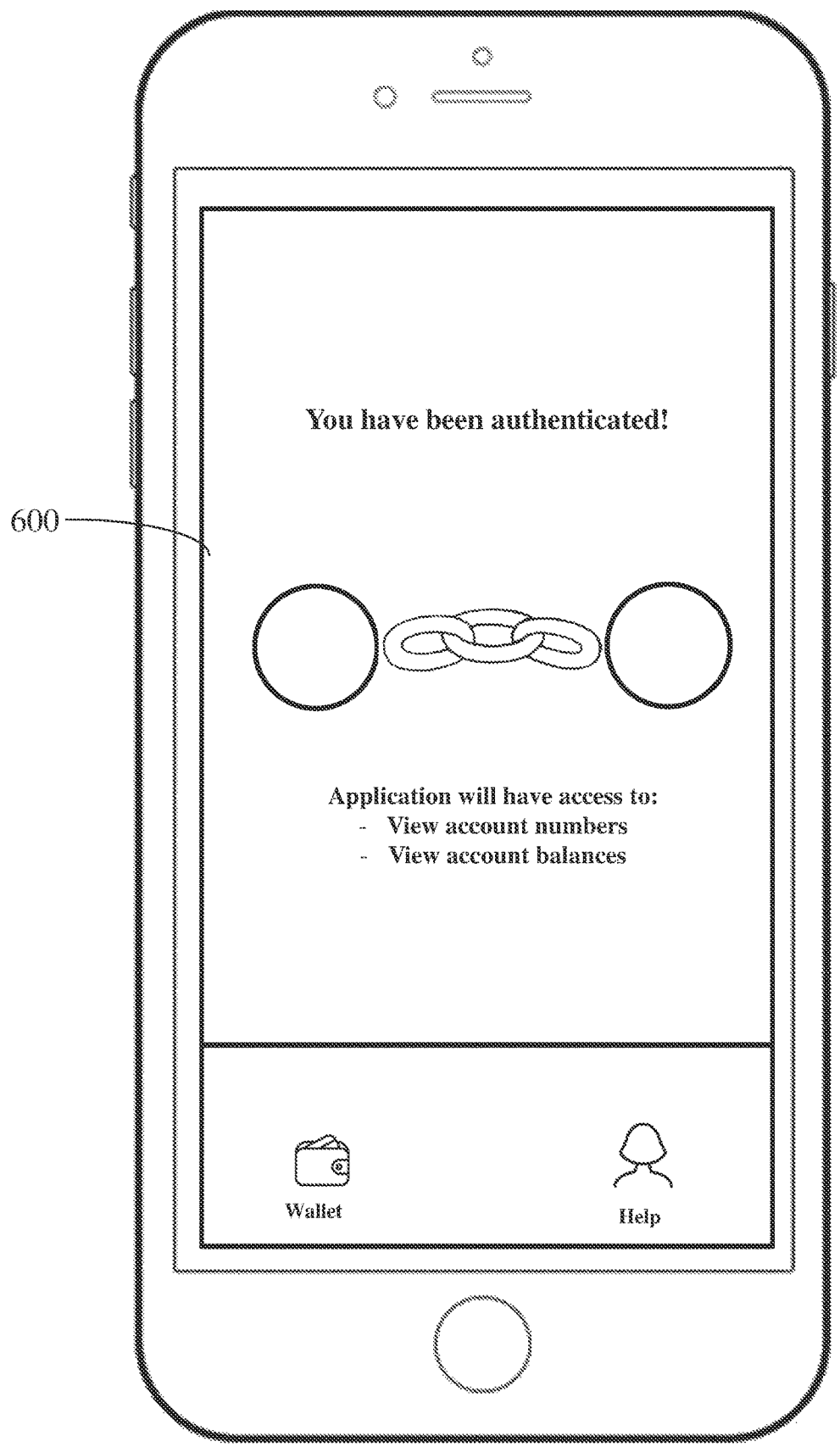
FIG. 6 illustrates an example of a graphical user interface displayed on the mobile device indicating positive authentication, according to an embodiment.

Referring now to FIG. 6, an example of a graphical user interface displayed on the mobile device indicating positive authentication is illustrated. The analytics server (upon authenticating the user as illustrated in step 280) may also update the graphical user interface on the first and/or the second computing device to reflect that the user has been authenticated and has access to his account. The analytics server may display authentication message 600 on the mobile device (second computing device).

Figure 5:
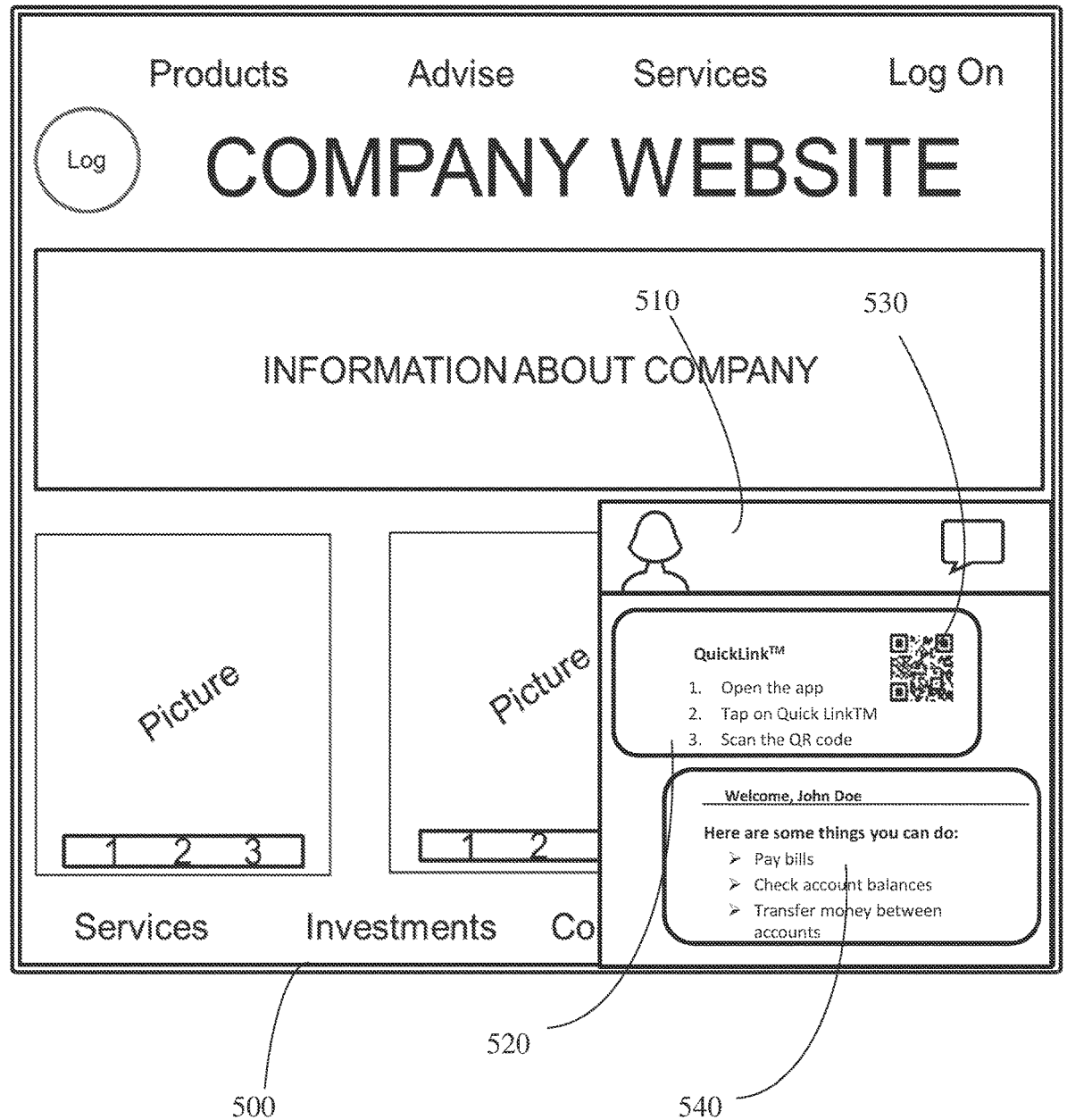
FIG. 5 illustrated an example of an encrypted media element displayed on a third-party graphical user interface, according to an embodiment.

Referring now to FIG. 5 an example of an encrypted media element displayed on a third-party graphical user interface is illustrated. The analytics server may also utilize the secure computer-implemented authentication method to grant users access to their accounts on third-party websites and virtual assistant platforms (e.g., Chabot). In some embodiments, the analytics server or an institution associated with the analytics server (e.g., a server associated with the analytics server) may provide a virtual assistant platform on the graphical user interface provided by the analytics sever or on a third party website. For example, the institution associated with the analytics server may provide a virtual assistant in form of a chatbot on a social media website. The chatbot may allow users to retain different services provided by the analytics server (or by other servers associated with the analytics server). In an example, a financial institute may provide a chatbot on a social media website and allow users (upon proper authentication and identification verification) check their account balance, transfer money, and/or pay bills. The users may initiate a chat session with a designated virtual assistant (e.g., chatbot), login their account (e.g., authentication verification), input their requests using natural language into a chat session, and perform actions similar to the actions they would perform on the website provided by the financial institute. The virtual assistant technology allows users to login their accounts and performs tasks while in a third-party website and provides an easy user interface and method for the user to perform tasks even if not on the financial institution's website. As stated above, the analytics server may use the disclosed method (FIGS. 2-5) to authenticate the user on a virtual assistant platform.

The analytics server may receive a request from the virtual assistant server to authenticate a user on a virtual assistant platform. The analytics server may then generate the media element (step 230) and transfer said media element to the virtual assistant server. The virtual assistant server may then display the first media element on a virtual assistant platform displayed on a third-party website. The analytics server may receive a second media element (step 250) from the mobile device and determine whether the first and second media elements positively match. Upon a positive match, the analytics server may identify the mobile device and an account within the database associated with the mobile device (steps 260-270) and transmit an instruction to the virtual assistant server to display a positive authentication message (e.g., update a GUI to display a similar message as the message depicted in FIG. 5). The analytics server may also grant the virtual assistant server access to the account of the mobile device.

The analytics server may also use a third-party computing device or a third-party computing system to dynamically authenticate a user. For example, a user may use a chatbot (displayed on a third-party website) to log into an account associated with the analytics server. In the embodiment depicted in FIG. 5, the user operating the client computing device has initiated a session with a third-party social networking website 500. The user has also initiated a chatbot associated with the analytics server (chat session 510). The analytics server may provide a variety of services through the chat session 510. For example, upon being fully authenticated, a user may check his account balances or perform other actions using the chat session 510. Upon initiating the chat session 510 the virtual assistant server (server associated with the chat session or the social networking website 500) transmits an authentication request to the analytics server. The analytics server may generate and transmit the first media element 530 to the virtual assistant server and instruct the virtual assistant server to display the first media element 530 along with authentication instructions 520 within the chat session 510. The authentication instructions 520 instruct the user to open the mobile application installed on the user's mobile device, instruct the mobile application to activate the QR code reader, and scan (e.g., take a picture, video, and the like). In some other configurations, the user may use other means (e.g., text messages) to transmit the image to the analytics server. The user may follow the authentication instructions 520 and scan the media element 530. Upon the user scanning the media element 530, the analytics server receives a media element from the mobile device of the user, compares the received media element with the media element 530. Upon verifying a positive match, the analytics server may query a database and retrieve information associated with an identifier associated with the mobile device of the user, determine an account associated with the mobile device, and transmit an instruction to the virtual assistant server to display authentication message 540. Authentication message 540 verifies that the user has been successfully authenticated and the user may have access to different services associated with the account.

As stated above, the computer-implemented method and system disclosed herein increase the difficulty for a bad actor to compromise highly sensitive information by hacking into a conventional database and retrieving authenticating data. For example, a bad actor may have to obtain access into a database, client computer device, and the mobile device to be able to retrieve account information, which is more difficult that obtaining access to a user's passcode. The method disclosed herein may serve as a roadblock to minimize cyber-attacks on sensitive data.

Example

In a non-limiting example, a user accesses a website and transmits a request to be authenticated (e.g., a request to be logged in his or her account) to an analytics server. The analytics server then generates a first image that is unique to the authentication request and displays the first image on the website. The analytics server then prompts the user to capture an image of the first image using an authenticated device. The user may then authenticate himself or herself to access and initiate an application executing on a second computing device (e.g., mobile device) where the applications is operationally connected to (e.g., hosted by) the analytics server. The user may then capture an image of the first media element displayed on the website. The applications may then transmit the captured image to the analytics server. Upon determining that the first image and the captured image are similar, the analytics server may then grant the first computing device access to an account associated with an identifier of the second computing device.

Although certain illustrative, non-limiting embodiments have been presented, various changes, substitutions, permutations, and alterations may be made without departing from the scope of the appended claims. Further, the steps of the methods described herein may be carried out in any suitable order, or simultaneously where appropriate. Thus, the scope of the disclosure should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, may refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The embodiments presented herein may relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g., computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The embodiments described herein are described as software executed on at least one server, though it is understood that embodiments may be configured in other ways and retain functionality. The embodiments may be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein may be used to implement the systems and techniques according to this disclosure.

The embodiments presented herein may relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology may be located at distant portions of a distributed network or the Internet, or within a dedicated secured, unsecured, addressed/encoded or encrypted system. Thus, it should be appreciated that the components of the system may be combined into one or more devices or co-located on a particular node of a distributed network, such as a telecommunications network. As will be appreciated from the description, and for reasons of computational efficiency, the components of the system may be arranged at any location within a distributed network without affecting the operation of the system. Moreover, the components could be embedded in a dedicated machine.

Furthermore, it should be appreciated that the various links connecting the elements may be wired or wireless links, or any combination thereof, or any other known or later developed element(s) that is capable of supplying or communicating data to and from the connected elements.

The term "module" as used herein may refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Presently preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation may be combined with one or more features of any other implementation.

We claim:

1. A method comprising:
   receiving, by a server, an authentication request for a financial service from a graphical user interface on a first computing device;
   generating, by the server, a first media element and one or more random numbers associated with the authentication request configured for display on a webpage via a web browser executing on the first computing device;

transmitting, by the server, an instruction to a virtual assistant server, wherein the virtual assistant server uses the instruction to cause a display, within a chat session with a virtual assistant on the graphical user interface, of the first media element and the one or more random numbers, wherein the one or more random numbers are displayed at a first location on the webpage;

receiving, by the server, a second media element from a second computing device, wherein the second media element is an image of the webpage containing the first media element and the one or more random numbers displayed on the webpage;

in response to
determining that the first and second media elements and the one or more random numbers have a positive match, and
verifying a second location of the one or more random numbers in the image matches the first location of the one or more random numbers on the webpage,
authenticating, by the server, the first computing device by granting the first computing device access to a financial account associated with the second computing device.

2. The method of claim 1, further comprising:
generating, by the server, the instruction to display the first media element and the one or more random numbers on the graphical user interface.

3. The method of claim 1, further comprising:
receiving, by the server via a messaging application executing on the second computing device, the second media element.

4. The method of claim 1, further comprising:
generating, by the server, authentication instructions based on the financial service for the first computing device.

5. The method of claim 1, further comprising:
determining, by the server, the financial account associated with the second computing device.

6. The method of claim 1, further comprising:
retrieving, by the server, an identification value associated with the second computing device.

7. The method of claim 6, wherein the identification value associated with the second computing device is a unique identifier associated with the second computing device.

8. A non-transitory computer-readable medium storing instructions that, when executed by a computing system, cause the computing system to perform operations comprising:
receiving an authentication request for a financial service from a graphical user interface on a first computing device;
generating a first media element and one or more random numbers associated with the authentication request configured for display on a webpage via a web browser executing on the first computing device;
transmitting an instruction to a virtual assistant server, wherein the virtual assistant server uses the instruction to cause a display, within a chat session with a virtual assistant on the graphical user interface, of the first media element and the one or more random numbers, wherein the one or more random numbers are displayed at a first location on the webpage;
receiving a second media element from a second computing device, wherein the second media element is an image of the webpage containing the first media element and the one or more random numbers displayed on the webpage;

in response to
determining that the first and second media elements and the one or more random numbers have a positive match, and
verifying a second location of the one or more random numbers in the image matches the first location of the one or more random numbers on the webpage,
authenticating the first computing device by granting the first computing device access to a financial account associated with the second computing device.

9. The non-transitory computer-readable medium of claim 8, wherein the operations further comprise:
generating the instruction to display the first media element and the one or more random numbers on the graphical user interface.

10. The non-transitory computer-readable medium of claim 8, wherein the operations further comprise:
receiving, via a messaging application executing on the second computing device, the second media element.

11. The non-transitory computer-readable medium of claim 8, wherein the operations further comprise:
generating authentication instructions based on the financial service for the first computing device.

12. The non-transitory computer-readable medium of claim 8, wherein the operations further comprise:
determining the financial account associated with the second computing device.

13. The non-transitory computer-readable medium of claim 8, wherein the operations further comprise:
retrieving an identification value associated with the second computing device.

14. The non-transitory computer-readable medium of claim 13, wherein the identification value associated with the second computing device is a unique identifier associated with the second computing device.

15. A system comprising:
one or more processors; and
one or more memories storing instructions that, when executed by the one or more processors, cause the system to perform a process comprising:
receiving an authentication request for a financial service from a graphical user interface on a first computing device;
generating a first media element and one or more random numbers associated with the authentication request configured for display on a webpage via a web browser executing on the first computing device;
transmitting an instruction to a virtual assistant server, wherein the virtual assistant server uses the instruction to cause a display, within a chat session with a virtual assistant on the graphical user interface, of the first media element and the one or more random numbers, wherein the one or more random numbers are displayed at a first location on the webpage;
receiving a second media element from a second computing device, wherein the second media element is an image of the webpage containing the first media element and the one or more random numbers displayed on the webpage;

in response to
- determining that the first and second media elements and the one or more random numbers have a positive match, and
- verifying a second location of the one or more random numbers in the image matches the first location of the one or more random numbers on the webpage,
  - authenticating the first computing device by granting the first computing device access to a financial account associated with the second computing device.

16. The system according to claim 15, wherein the process further comprises:
generating the instruction to display the first media element and the one or more random numbers on the graphical user interface.

17. The system according to claim 15, wherein the process further comprises:
receiving, via a messaging application executing on the second computing device, the second media element.

18. The system according to claim 15, wherein the process further comprises:
generating authentication instructions based on the financial service for the first computing device.

19. The system according to claim 15, wherein the process further comprises:
determining the financial account associated with the second computing device.

20. The system according to claim 15, wherein the process further comprises:
retrieving an identification value associated with the second computing device, wherein the identification value associated with the second computing device is a unique identifier associated with the second computing device.

* * * * *